United States Patent
Volkart

(10) Patent No.: US 10,074,362 B2
(45) Date of Patent: Sep. 11, 2018

(54) SYSTEM AND METHOD FOR ASSESSING SECURITY THREATS AND CRIMINAL PROCLIVITIES

(71) Applicant: **Global Tel*Link Corporation**, Reston, VA (US)

(72) Inventor: Mitch Volkart, Hartsburg, MO (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

(21) Appl. No.: 15/420,921

(22) Filed: Jan. 31, 2017

(65) Prior Publication Data

US 2018/0218730 A1    Aug. 2, 2018

(51) Int. Cl.

| | |
|---|---|
| G10L 15/00 | (2013.01) |
| G10L 15/18 | (2013.01) |
| G10L 15/26 | (2006.01) |
| G10L 17/00 | (2013.01) |
| G10L 15/08 | (2006.01) |

(52) U.S. Cl.
CPC ........ *G10L 15/1822* (2013.01); *G10L 15/265* (2013.01); *G10L 17/005* (2013.01); *G10L 2015/088* (2013.01)

(58) Field of Classification Search
USPC .................. 704/231–257, 270–275
See application file for complete search history.

(56) References Cited

U.S. PATENT DOCUMENTS

| | | |
|---|---|---|
| 5,535,261 A | 7/1996 | Brown et al. |
| 6,052,454 A | 4/2000 | Kek et al. |
| 6,064,963 A | 5/2000 | Gainsboro |
| 6,763,099 B1 | 7/2004 | Blink |
| 7,039,171 B2 | 5/2006 | Gickler |
| 7,085,359 B2 | 8/2006 | Crites et al. |
| 7,106,843 B1 | 9/2006 | Gainsboro et al. |
| 7,280,816 B2 | 10/2007 | Fratti et al. |
| 7,366,782 B2 | 4/2008 | Chong et al. |

(Continued)

OTHER PUBLICATIONS

"Application Examples," WG Systems, copyright 2001-2003, http://www.wgsystems.com.br/english/dc/wg_applic_exemp.htm#Corrections.

(Continued)

*Primary Examiner* — Jesse Pullias
(74) *Attorney, Agent, or Firm* — Sterne, Kessler, Goldstein & Fox P.L.L.C.

(57) ABSTRACT

A centralized and robust threat assessment tool is disclosed to perform comprehensive analysis of previously-stored and subsequent communication data, activity data, and other relevant information relating to inmates within a controlled environment facility. As part of the analysis, the system detects certain keywords and key interactions with the dataset in order to identify particular criminal proclivities of the inmate. Based on the identified proclivities, the system assigns threat scores to inmate that represents a relative likelihood that the inmate will carry out or be drawn to certain threats and/or criminal activities. This analysis provides a predictive tool for assessing an inmate's ability to rehabilitate. Based on the analysis, remedial measures can be taken in order to correct an inmate's trajectory within the controlled environment and increase the likelihood of successful rehabilitation, as well as to prevent potential criminal acts.

19 Claims, 8 Drawing Sheets

(56) References Cited

U.S. PATENT DOCUMENTS

| | | | |
|---|---|---|---|
| 7,529,357 | B1 | 5/2009 | Rae et al. |
| 7,804,941 | B2 | 9/2010 | Keiser et al. |
| 7,805,457 | B1 | 9/2010 | Viola et al. |
| 7,860,222 | B1 * | 12/2010 | Sidler .................. H04L 63/302 379/266.1 |
| 7,899,167 | B1 | 3/2011 | Rae |
| 8,031,052 | B2 | 10/2011 | Polozola |
| 8,498,937 | B1 | 7/2013 | Shipman, Jr. et al. |
| 8,542,802 | B2 * | 9/2013 | Olligschlaeger .... H04M 3/2281 379/88.01 |
| 8,917,848 | B2 | 12/2014 | Torgersrud et al. |
| 9,094,500 | B1 | 7/2015 | Edwards |
| 9,232,051 | B2 | 1/2016 | Torgersrud et al. |
| 9,300,791 | B1 | 3/2016 | Higgs |
| 9,307,386 | B2 | 4/2016 | Hodge et al. |
| 2001/0036821 | A1 | 11/2001 | Gainsboro et al. |
| 2002/0071537 | A1 | 6/2002 | Gainsboro |
| 2003/0126470 | A1 | 7/2003 | Crites et al. |
| 2004/0029564 | A1 | 2/2004 | Hodge |
| 2004/0114740 | A1 | 6/2004 | Gickler |
| 2005/0039036 | A1 | 2/2005 | Eisen |
| 2006/0095251 | A1 * | 5/2006 | Shaw .................. G06F 17/2765 704/9 |
| 2011/0286585 | A1 * | 11/2011 | Hodge .................... H04M 1/67 379/88.02 |
| 2012/0262271 | A1 | 10/2012 | Torgersrud et al. |
| 2013/0078912 | A1 | 3/2013 | San Vicente et al. |
| 2014/0247926 | A1 * | 9/2014 | Gainsboro .......... H04M 3/2281 379/88.01 |
| 2014/0273929 | A1 | 9/2014 | Torgersrud |
| 2014/0287715 | A1 | 9/2014 | Hodge et al. |

OTHER PUBLICATIONS

"IVVIS," TEM Systems, Inc., copyright 2003, http://www.temsystems.com/inmate.htm.

"Quality Turnkey Solutions from Experienced Telecommunication Professionals for All Your Video, Data, Voice, Security, Networking, and Wireless LAN, MAN, and WAN Applications," Telecom Engineering Consultants, copyright 2002, http://www.tec-inc.com/.

"Todd Video Network Management, Inc. Announces New Product TC Reliance Video Visitation. Manager 1.0," Press Release, Apr. 23, 2003, http://www.toddvnm.com/pr/042320032.htm.

"Criminal Calls: A Review of the Bureau of Prisons' Management of Inmate Telephone Privileges," U.S. Department of Justice, Office of the Inspector General, Aug. 1999.

Beek et al., "An Assessment of the Technology of Automatic Speech Recognition for Military Applications," IEEE Transactions on Acoustics, Speech, and Signal Processing, vol. ASSP-25, No. 4, Aug. 1977; pp. 310-322.

Chen et al., "COPLINK: Managing Law Enforcement Data and Knowledge," Communications of the ACM, vol. 46, No. 1, Jan. 2003; pp. 28-34.

Complaint for Patent Infringement, filed Aug. 1, 2013, *Securus Technologies, Inc.* v. *Global Tel\*Link Corporation*, Case No. 3:13-cv-03009-K (N.D. Tex.).

File History of U.S. Pat. No. 7,805,457, U.S. Appl. No. 12/031,460, filed Feb. 14, 2008.

File History of U.S. Pat. No. 9,094,500, U.S. Appl. No. 14/322,869, filed Jul. 2, 2014.

Harper et al., "The Application of Link Analysis to Police Intelligence," Human Factors: The Journal of the Human Factors and Ergonomics Society, vol. 17, No. 2, 1975; pp. 157-164.

International Search Report and Written Opinion directed to International Patent Application No. PCT/US2017/029412, dated Jul. 7, 2017; 12 pages.

Jeanrenaud et al., "Spotting Events in Continuous Speech," IEEE International Conference on Acoustics, Speech, and Signal Processing, 1994; pp. 1381-1384.

Knox, "The Problem of Gangs and Security Threat Groups (STG's) in American Prisons Today: Recent Research Findings From the 2004 Prison Gang Survey," National Gang Crime Research Center, 2005; 67 pages.

Krebs, V. E., "Mapping Networks of Terrorist Cells," Connections vol. 24, No. 3, 2002; pp. 43-52.

Maghan, J., "Intelligence Gathering Approaches in Prisons," Low Intensity Conflict & Law Enforcement, vol. 3, No. 3, 1994; pp. 548-557.

Miller, C., "Shareable Intelligence: New and Improved Software Helps Police Fight Crime and Terrorism." Law Enforcement Technology vol. 32, No. 6, Jun. 2005; pp. 20, 22, 24-29.

Rey, R.F., ed., "Engineering and Operations in the Bell System," 2nd Edition, AT&T Bell Laboratories: Murray Hill, NJ, 1983.

Rohlicek et al., "Continuous Hidden Markov Modeling for Speaker-Independent Word Spotting." IEEE International Conference on Acoustics, Speech, and Signal Processing , 1989; pp. 627-630.

Rosenberg, et al., "SIP: Session Initial Protocol," Network Working Group, Standard Track, Jun. 2002; 269 pages.

Smith, Megan J., "Corrections Turns Over a New LEAF: Correctional Agencies Receive Assistance From the Law Enforcement Analysis Facility," Corrections Today, Oct. 1, 2001.

Sparrow, M. K., "The application of network analysis to criminal intelligence: An assessment of the prospects," Social Networks vol. 13, 1991; pp. 251-274.

Winterdyk et al., "Managing Prison Gangs," Journal of Criminal Justice, vol. 38, 2010; pp. 730-736.

Xu et al., "CrimeNet Explorer: a Framework for Criminal Network Knowledge Discovery," ACM Transactions on Information Systems, vol. 23, No. 2, Apr. 2005; pp. 201-226.

International Search Report and Written Opinion directed to International Patent Application No. PCT/US2018/015991, dated Feb. 23, 2018; 11 pages.

* cited by examiner

SYSTEM AND METHOD FOR ASSESSING SECURITY THREATS AND CRIMINAL PROCLIVITIES

BACKGROUND

Field

The disclosure relates to a system and method for assessing security threats and criminal proclivities within a prison environment.

Background

Prison life can have a profound impact on an individual. In some circumstances, an inmate is motivated to correct his previous mistakes and turn away from a life of crime. In other circumstances, an inmate may become hardened, finding no alternative to, or even a certain amount of comfort in, a life of crime. The outcome for each individual can differ greatly depending on their respective personalities, as well as the events that befall those inmates during their time in prison.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
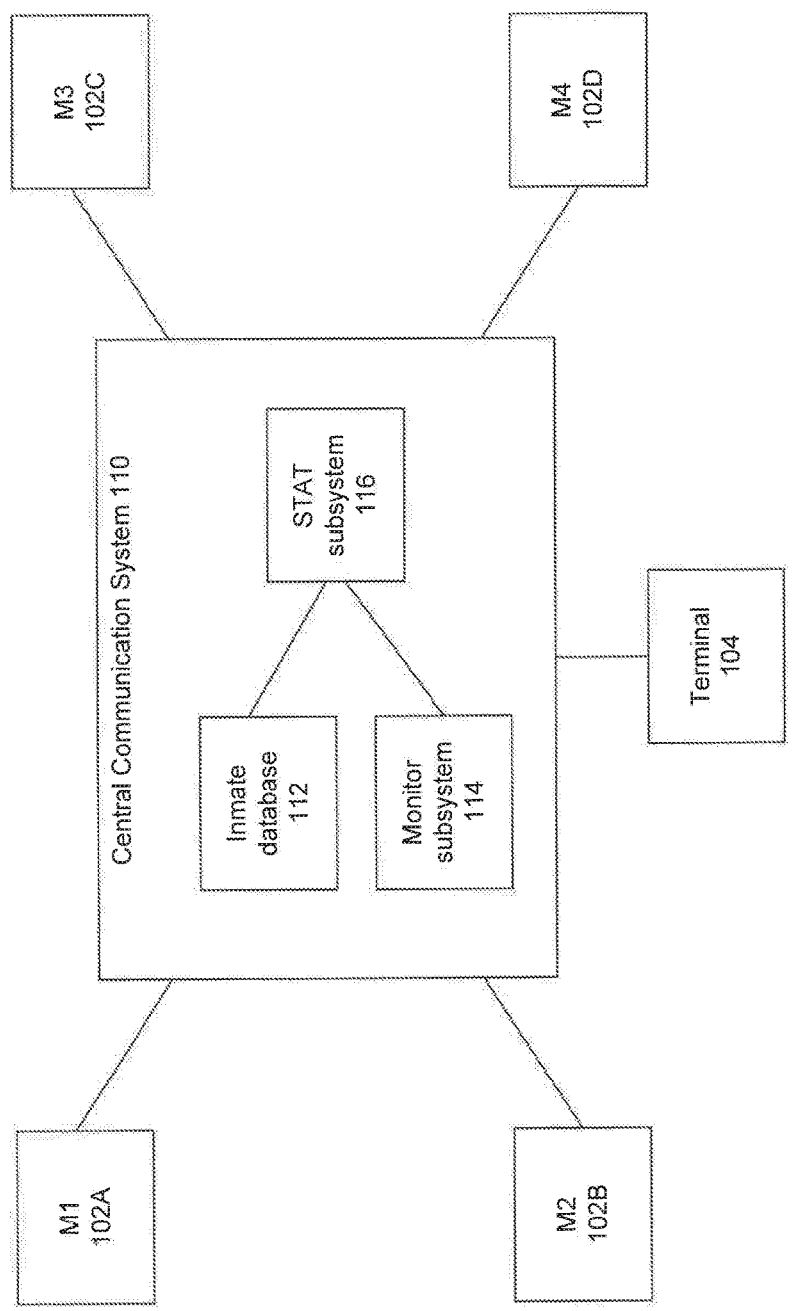
FIG. 1 illustrates a block diagram of an exemplary monitoring environment according to an exemplary embodiment.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

As discussed above, inmates in a prison facility are greatly affected by the prison environment. Whereas some seek to correct the mistakes that found them incarcerated, others embrace a criminal lifestyle. A major concern in the American criminal justice system is the rate of recidivism—the number of inmates that return to prison after release from repeat crimes. Due to the dramatic overpopulation of America's prisons, recidivism is a significant problem. Additionally, the reclamation of former inmates back into normal society is a benefit that most can't deny. As a public policy issue, we would rather our citizens contribute to society and be present amongst their families than to wallow behind bars.

In current prison environments, inmates are monitored in numerous ways. This is primarily through the monitoring of inmate telephone communications, but is also manifested in other ways. In preparation for this application, applicant has discovered that, when repeat offenders' monitored histories are reviewed carefully, the circumstances that led to their reincarceration can often be gleaned from various events that occurred throughout their time under monitoring. For example, a convicted carjacker using library time to research automobiles and automobile manuals, an inmate convicted of assault repeatedly getting in fights in the yard, a convicted gang member associating with other gang members, etc.

Therefore, described herein is a system and method for utilizing monitored information about an inmate to predict the inmate's proclivity to commit certain crimes in the future. This same method can likewise be used to perform general threat assessment as an investigative tool. Utilizing this system, inmates with particularly high threat scores can be counseled, or some other preventative measure can be taken, in order to increase the likelihood of successful rehabilitation. This system is described in further detail below with respect to the relevant figures.

Communication System

FIG. 1 illustrates a block diagram of an exemplary monitoring environment 100 according to an exemplary embodiment. In the environment 100, a central communication system 110 serves as the primary monitoring system. Multiple monitored devices 102A-D are connected to the central communication system 110. The monitored devices 102 can include a variety of different monitored devices. For example, monitored device 102A can include wired telephones within the prison environment used by the inmates for personal calls, monitored devices 102B can include personal electronics devices provided to the inmates by the prison for personal communication, Internet use, and data streaming services, monitored devices 102C can include one or more microphones hidden either in the yard or cell blocks to pick up personal conversations amongst inmates, and monitored devices 102D can include other data gathering devices, such as library checkout terminals, work sign-in terminals, etc. In addition to the monitored devices 102, a terminal 104 is also connected to the central communication system by which administrative officials can manually enter relevant information, such as incident reports, work reviews, and any other information that may be relevant to threat assessment and criminal proclivities.

All of this information is routed to the central communication system 110 via the monitoring subsystem 114. The monitoring subsystem 114 is responsible for analyzing the received information and detecting/identifying potential threat topics, as described in further detail below.

The threat topics identified by the monitoring subsystem 114 are forward to the STAT (security threat assessment tool) subsystem 116. The STAT subsystem 116 accesses the inmate database 112 to retrieve known threat information relating to the inmate associated with the received threat topics. The monitoring subsystem 114 analyzes the threat topics received from the monitoring subsystem 114 against the retrieved threat information from the inmate database 112, and makes several determination. In an embodiment, the STAT subsystem 116 determines whether the threat information stored in the inmate database 112 requires updating, and forwards the updated threat information to the inmate database 112 for storage. In an embodiment, the STAT subsystem 116 also determines whether to alert administrative personnel as to a particular threat. These and other features of the STAT subsystem 116 will be discussed in further detail below.

Monitoring Subsystem

Figure 2:
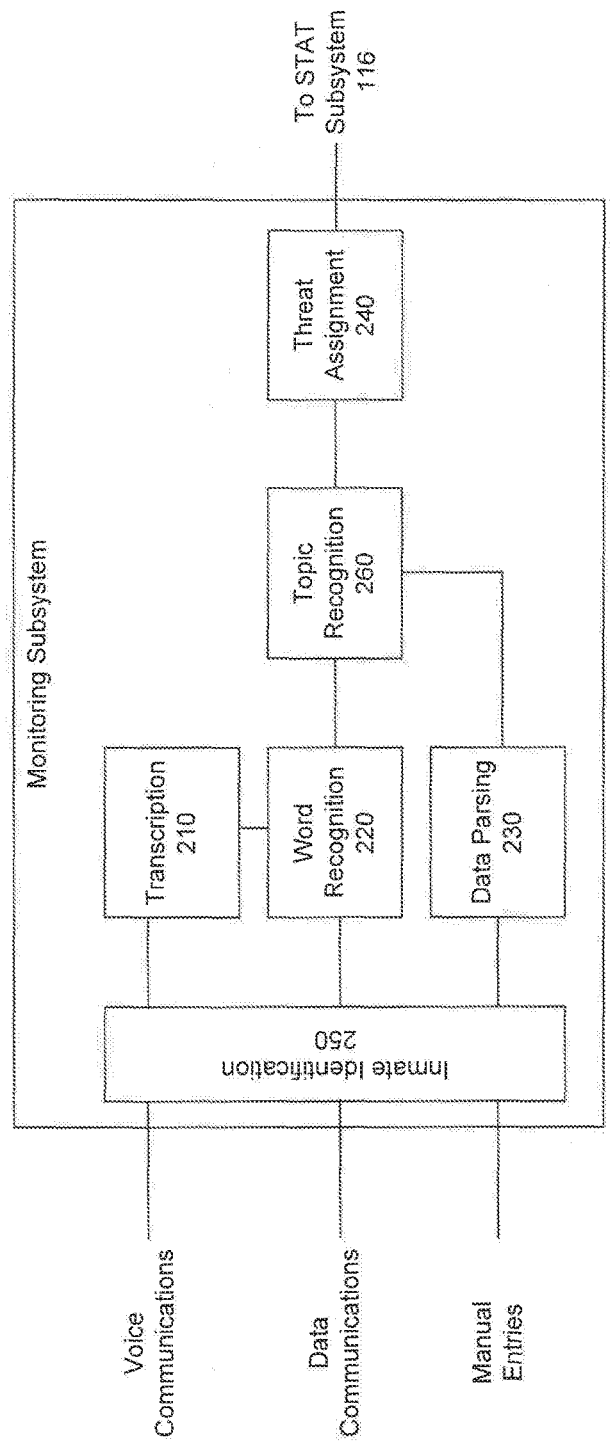
FIG. 2 illustrates a block diagram of a monitoring subsystem according to an exemplary embodiment.

FIG. 2 illustrates a block diagram of a monitoring subsystem 200 according to an exemplary embodiment. The monitoring subsystem includes a transcription 210, word/topic recognition 220, data parsing 230 and threat assignment 240 and represents an exemplary embodiment of the monitoring subsystem 114.

The monitoring subsystem 200 receives various types of data from the monitored devices 102. As described above, this data can include voice communications and data communications (such as Internet browsing information, etc.). The monitoring subsystem 200 also received manual entries from the terminal 104. Initially, the monitoring subsystem 200 performs inmate identification in order to identify the inmate associated with the communication. When an inmate uses an authorized device, he/she is required to submit to a detailed authentication process in order to ensure the inmate's identity. Once verified, the identity information is transmitted to the monitoring subsystem 200 along with the communication data. Thus, the inmate identification 250 can identify the inmate based on this information. For a manual entry, the administrator submitting the entry is required to identify the inmate in order to generate the report. Once again, the monitoring subsystem 200 can identify the inmate based on that information, which is transmitted to the central communication system 110 from the terminal.

For live-monitored communications, the inmate identification 250 performs voice analysis on the received audio data. As part of this analysis, the inmate identification 250 uses audio analysis to detect a primary and secondary, etc. voice in the recording. Once the multiple voices have been identified, they are isolated from each other. This can be performed through audio segmentation by detecting alternating vocal characteristics within the audio stream. After the different voices have been isolated, the inmate identification 250 performs vocal analysis on each of the different voices in order to generate corresponding voiceprints or other vocal signatures. After the voiceprints have been generated, the voiceprints are compared to stored voiceprints by correlating the generated voiceprints to previously-stored voiceprints. In an embodiment, the voiceprint comparison can account for vocal fluctuations, such as prosody. The comparison returns probabilities with respect to one or more inmates of positive identification. Based on those probabilities, the identity of the speaker can be determined.

Depending on the type of information received, the monitoring subsystem must perform different functions in order to properly analyze the received information. For example, voice information is routed to a transcription subsystem 210, which transcribes the voice information into text using speech recognition processing.

Once in text format, the communication is forward to a word recognition subsystem 220. The word recognition subsystem 220 is configured to analyze the communication and detect certain keywords. The detection of keywords consists of identifying within the text communication words from a keyword dictionary. In other words, keywords are generally identified in advance and stored in a keyword database (i.e., dictionary). After the keywords have been detected, topic recognition 260 identifies one or more topics based on the identified keywords. In order to identify topics, a topic database maps a plurality of keywords to each of a variety of different topics. A topic may have one or more keywords associated with it and may share any or all of those keywords with another topic. The topic recognition 260 identifies the topics discussed during the communication by identifying those topics in the topic database having keywords identified in the communication.

In an embodiment, the keywords stored in the topic database are ranked according to the relative importance or relevance to the corresponding topic. For example, the topic of "murder" may include keywords such as "kill" and "waste". In the database, although both of those keywords are stored in the "murder" topic, the keyword "kill" is ranked 10 (out of 10, highest being most relevant/important) whereas "waste" is ranked 4 (due to its many other non-offensive uses). In this embodiment, the topic recognition 260 may identify all topics with matching keywords in the communication along with a score for each of the identified topics. The scores may be a sum of the keyword values identified, or an average of those values.

As discussed above, the monitoring subsystem 200 also receives manual entries. These entries can take many forms, such as incident reports, work reviews, etc., thus making analysis according to keyword searching rather difficult. Therefore, in an embodiment, the manual entries are submitted according to pre-established formats. Thus, data parsing 230 parses out the relevant information from the manual entry in order to identify keywords from the entry. These keywords are then forwarded to the topic recognition 260, and processed in the same manner as described above.

Once all topics have been identified, threat assignment 240 is performed in order to identify the final relevant threats associated with the inmate. In an embodiment, threat assignment outputs all identified topics, without modification. Although this is considered the most thorough approach, it also results in a large number of false positives. Therefore, in an alternative embodiment, the threat assignment 240 also looks at the topic scores assigned by the topic recognition 260. For example, a particular inmate communication may have had ten topics identified, each with its own score. In a first embodiment, the threat assignment 240 outputs all topics whose scores exceed a predetermined threshold. In a second embodiment, the threat assignment 240 outputs only a predetermined number of the highest scored topics from among those detected. In a third embodiment, the threat assignment outputs the topics whose scores exceed the predetermined threshold up to a maximum number of topics.

STAT Subsystem

Figure 3:
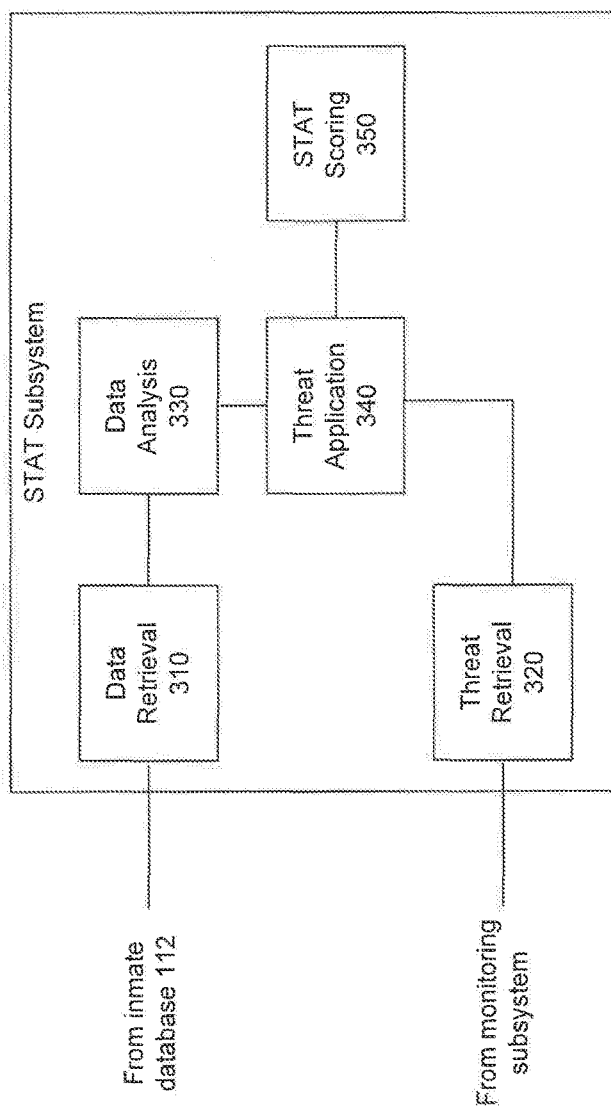
FIG. 3 illustrates a block diagram of a STAT subsystem according to an exemplary embodiment.

FIG. 3 illustrates a block diagram of a STAT subsystem 300 according to an exemplary embodiment. The STAT subsystem 300 includes data retrieval 310, threat retrieval 320, data analysis 330, threat application 340 and STAT scoring 350, and may represent an exemplary embodiment of the STAT subsystem 116. The STAT subsystem 300 is responsible for performing statistical analysis on a wide variety of inmate data in order to generate a STAT score for different inmates. The STAT score is a representation of the inmate's propensity to commit or be drawn to a particular crime.

In order to carry out ongoing STAT scoring functionality, the STAT subsystem 300 must generate initial STAT scores for the inmate population. This typically occurs shortly after installation at a particular prison communication. In an embodiment, the STAT subsystem is installed within a central communication system that serves multiple prisons within a particular region, and thus performs the initial STAT scoring for the inmate population of all served prisons.

For the initial STAT scoring, the STAT subsystem 300 has access to one or more inmate databases containing various information relating the inmates of the inmate population. Such information may include calling history, police reports, incident reports, work reviews/reports, behavior records, counseling matters, rap sheets, and Internet browsing histories, among others. This information may be stored in a single inmate database or may be spread across multiple databases.

The data retrieval 310 provides the STAT subsystem access to the desired databases, and may retrieve that information to be processed and analyzed locally at the STAT subsystem 300. The data analysis engine 330 is an extremely robust data analysis tool that is capable of examining the collective data and identifying relationships therein. This can be performed, for example, through virtual link charting. Link charting is a visual data analysis method that is used to make sense of complex relationships hidden within large amounts of data. The method is carried out by visually depicting individual events and drawing lines between events that share some relationship. The lines can be color coded for different relationships. In this scenario, more lines connected to a common node provide an investigative point of interest within the data and show how other such nodes relate to that point of interest.

A similar virtual process can be carried out by the data analysis engine 330. However, where a visual method is carried out for human understanding, the data analysis engine 330 performs the analysis virtually, forgoing the visual representation. Instead, the data analysis engine 330 identifies and tracks relationships between different data points in order to identify trends in the data. When enough data has been analyzed, the data analysis engine 330 identifies certain patterns of behavior based on the identified relationships that show a particular inmate's state of mind toward certain criminal actions or his/her associations with certain known bad actors. Based on these identified patters, the data analysis engine 330 extracts from the data certain proclivities for each inmate.

The data analysis engine 330 also assigns a weight to each of the identified proclivities based on the strength of the relationships among the different nodes. For example, when many relationships exist in the dataset amongst data points relating to assault and battery, assault and battery is identified as a proclivity of the inmate and is weighted relatively high. On the other hand, when few relationships exist in the dataset amongst data points relating to murder, murder is identified as a proclivity of the inmate and is weighted relatively low. In an embodiment, a predetermined minimum number of relationships among common data points are required in order for a particular topic to be identified as a proclivity for a particular inmate. This helps to reduce data processing and avoid false positives.

Once the data analysis engine 330 identifies the various proclivities of the inmate and assigns a weight to each of those proclivities, that information is passed to the STAT scoring 350 (in the initial analysis instance, the threat application 340 adds nothing because no new threats have been identified, as will be discussed further below).

The STAT scoring 350 is configured to provide one or more threat scores to the inmate based on the data received. The threat scores are numerical values that indicate a particular inmate's relative likelihood to commit a bad act in line with the associated threat. Such threats may include any known criminal act, civil violation, rule break, or any other discouraged or tracked behavior. Such threats may include, and are not limited to, theft, murder, assault and battery, burglary, weapon violations, sexual assault, racism, skipping work, drug violations, among many others.

In an embodiment, the STAT scoring 350 calculates a threat score for the inmate for all known threats. Threats for which an inmate showed no propensity to commit, or whose relationships were deemed by the data analysis engine 330 as falling below the required minimum, are scored zero. Positive value scores are generated for all other threats. In an embodiment, negative scores could also be assigned for threats against which the inmate has shown a particular resistance, which can also be detected by the data analysis engine 330.

In the case of the initial analysis, the STAT scoring 350 examines the weights applied by the data analysis engine. In an embodiment, the STAT scoring 350 simply assigns those weights to be the STAT scores for the corresponding threats and no further processing takes place. However, in a preferred embodiment, the weights assigned by the data analysis engine 330 are normalized against the proclivities of the entire population. In order to perform the normalization process, the STAT scoring 350 receives the weights of the inmates in addition to other data, such as the numbers of relationships for each of the different threats and the number of data points analyzed for each inmate. In an embodiment, the STAT scoring 350 calculates a ratio between the number of relationships detected and the number of data points analyzed for a particular inmate and then scales the weight by that ratio. A similar process is performed for the other inmates, and then all scores are scaled based on the relative number of data points analyzed. Other methods are also available for normalizing scoring values for particular threats. The initial STAT scores are then stored in the inmate database 112 for future use.

Once the initial STAT scores have been calculated and stored, the STAT subsystem can be used for ongoing and real-time analysis, such as will be discussed below.

In the case of ongoing threat analysis, the threat retrieval 320 receives threat information from the monitoring subsystem 114. As described above, the threat information may include one or more topics that were identified in a particular communication or activity that demonstrate the inmate's proclivity toward a certain threat. In an embodiment, and as discussed above, this information may also demonstrate a certain resistance to a particular threat. Upon receipt of the threat information, the data retrieval 310 retrieves previously-calculated threat information from the inmate database 112 relating to the inmate. The threat application 340 then applies the newly-received threat information to the previously stored threat information. In an embodiment, the threat application compares the weights associated with the received threats to those of the previously-stored threats and forward the results to the STAT scoring 350.

The threat application 340 also performs alert control based on the comparison. Specifically, based on the comparison of the weights of the newly-received threat information to those of the previously-stored threat information, the threat application 340 may take certain remedial actions in order to reduce the risk that the inmate carries out a particular threat.

There are many different events that may trigger an alert. Such events may include a measurable increase in an inmate's proclivity toward a particular threat, increased associations with known offenders of a particular threat, detection of certain keywords, etc. Additionally, the threat application 340 may recommend different remedial actions in response to the detection of the event, such as counseling, segregation, monitoring, etc.

After the threat application 340 has compared the newly-received threats to the previously-stored threat information, the threat application 340 forwards the results to the STAT scoring 350. The STAT scoring 350 determines whether the STAT score for any particular threat requires updating based on the comparison data. In an embodiment, the STAT score carries out an algorithm that adjusts the inmate's STAT score based on the comparison data between the previous and new threat information. For example, in an embodiment, the STAT scoring 350 increases the STAT score when threat information history shows an increase in the frequency of the particular threat being detected. In an embodiment, the STAT scoring 350 also increases the STAT score when a newly-received threat has a sufficiently high weight associated with it, representing a relatively high threat.

Once updated, the STAT scoring 350 forwards the new STAT scores to the inmate database 112 for storage. In a preferred embodiment, the updated STAT score is stored as "current" so that it can be readily accessed and observed, but does not overwrite previous STAT scores. In this manner, the history of an inmate's STAT scores and trends within those STAT scores can be observed over time by both an evaluating administrator and the STAT subsystem 300.

As described above, the STAT scoring 350 calculates a STAT score for each inmate and for each threat. Thus, each inmate has a STAT score for each known threat. These STAT scores represent the inmate's proclivity toward a particular threat and his/her relative likelihood of committing the threat. In an embodiment, the STAT score 350 also calculates a general STAT score that defines the inmate's relative likelihood to commit any of the known threats.

In the manner described above, an inmate's proclivity toward a particular threat or any known threat can be tracked and monitored. Furthermore, the information gleaned from the STAT analysis can be utilized prior to the inmate committing any of the known threats in order to prevent those threats from being carried out and to adjust the inmate's circumstances to improve his chance at successful rehabilitation.

Reporting

Figure 4A:
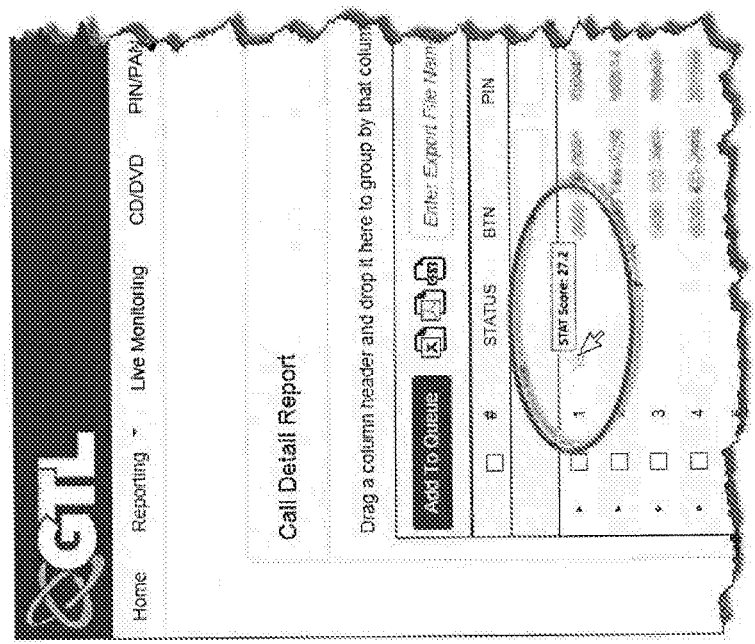
FIGS. 4A-4C depict screenshot illustrations of exemplary reporting displays according to various embodiments.
Figure 4B:
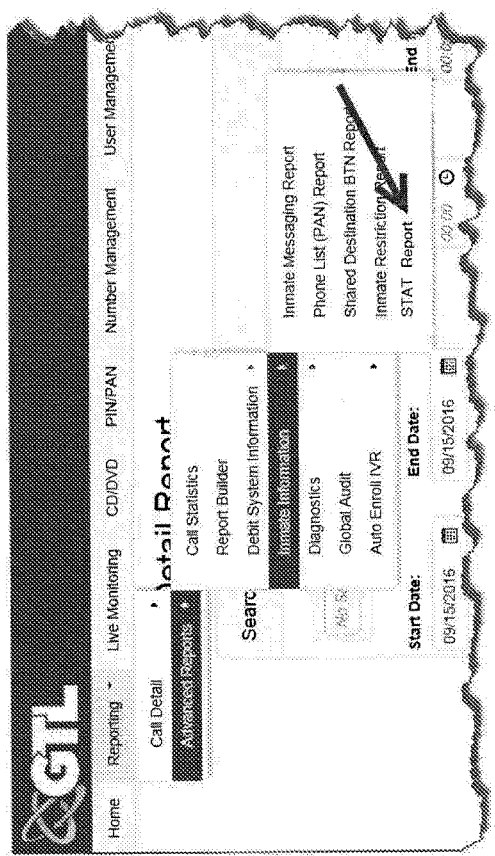
Figure 4C:
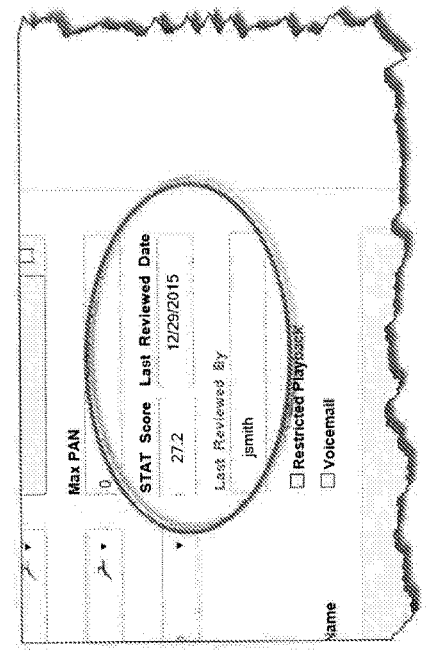

Although the STAT scores are calculated and stored in the background of the central communication system 100, those scores can be reported to administrative personnel in a variety of different ways. FIGS. 4A-4C depict screenshot illustrations of exemplary reporting displays according to various embodiments.

FIG. 4A depicts a screenshot illustration of an exemplary Call Detail Report. Call Detail Reports show a listing of all telephone calls involving one or more inmates, and can include several different details about those calls, such as called number, inmate identity, call duration, call timestamp, etc. As shown in FIG. 4A, in an embodiment, an icon can be displayed on the Call Detail Report. An administrator can use a graphical pointing device at the terminal (104) to hover over or click on the icon. In response, the system a predefined level of detail relating to the identified inmate's STAT score. In an embodiment, the system displays the user's general STAT score in response to the user's hovering over the icon, and displays a detailed STAT report (e.g., all individual STAT scores) in response to the user clicking on the icon. In another embodiment, the system displays the most relevant STAT score to the corresponding communication (e.g., a STAT score for an identified threat within the communication).

FIG. 4B illustrates a screenshot illustration of an exemplary Report Generation screen. At numerous screens within the graphical user interface of the administrative system, an administrator can navigate through a menu of options to generate a full STAT report for an identified inmate. The resulting report can be customized according to the administrator's inputs to a menu. For example, the report can be configured to produce STAT scores for one or multiple inmates, can be configured to display general STAT scores or specific STAT scores, and can even provide spreadsheet or graphical representations of STAT score histories and trends.

FIG. 4C illustrates a screenshot illustration of a Report Customization screen. This screen provides a variety of different dropdown menus, checkboxes, and other customization tools to allow the administrator to customize the report to his preferences. Within the Report Customization screen, the system also provides the administrator with the current general STAT score and a date at which the STAT score was last updated and reviewed. In an embodiment, the system also displays a name of a reviewer.

Figure 5:
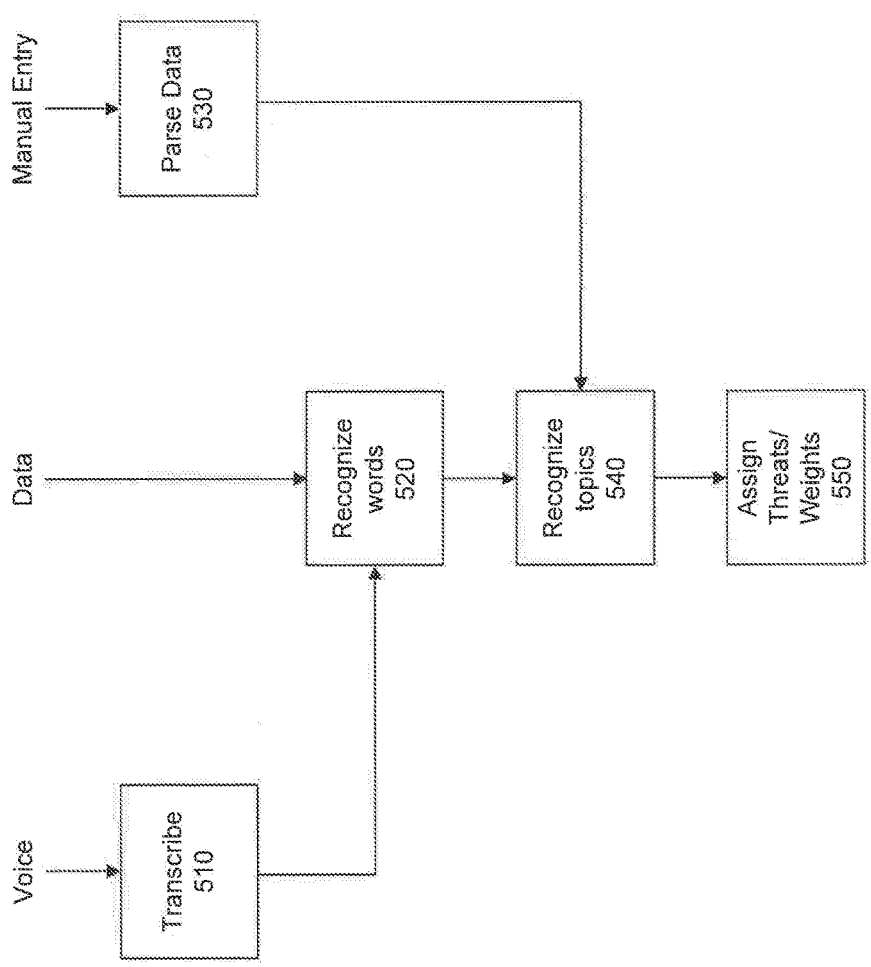
FIG. 5 illustrates a flowchart diagram of an exemplary method for identifying potential threats within a particular communication according to an embodiment.

FIG. 5 illustrates a flowchart diagram of an exemplary method 500 for identifying potential threats within a particular communication according to an embodiment. The method of FIG. 5 will be described with reference to relevant structural components of the monitor subsystem 200.

In the method 500, voice, data and manual entries can all be received and processed for potential threats. In the case of Voice, the communication is first transcribed (510). Using the transcript of the communication, word recognition is then performed (520) to detect particular keywords. These keywords are stored in a database in relation to known threats. In the case of Data, the communication does not require transcription, and thus word recognition (520) can be performed directly thereon. In the case of manually entered data, the data must first be parsed (530) according to predefined formats and rules in order to extract relevant information.

After the keywords have been recognized within the communication (520) or the data has been parsed from the manual entry (530), topic recognition (540) is then performed on the resulting information, which matches the keywords and parsed data to known threats stored in a database. After the topics have been recognized (540), final threats and weights are assigned to the communication (550) in the manner describe above.

Figure 6:
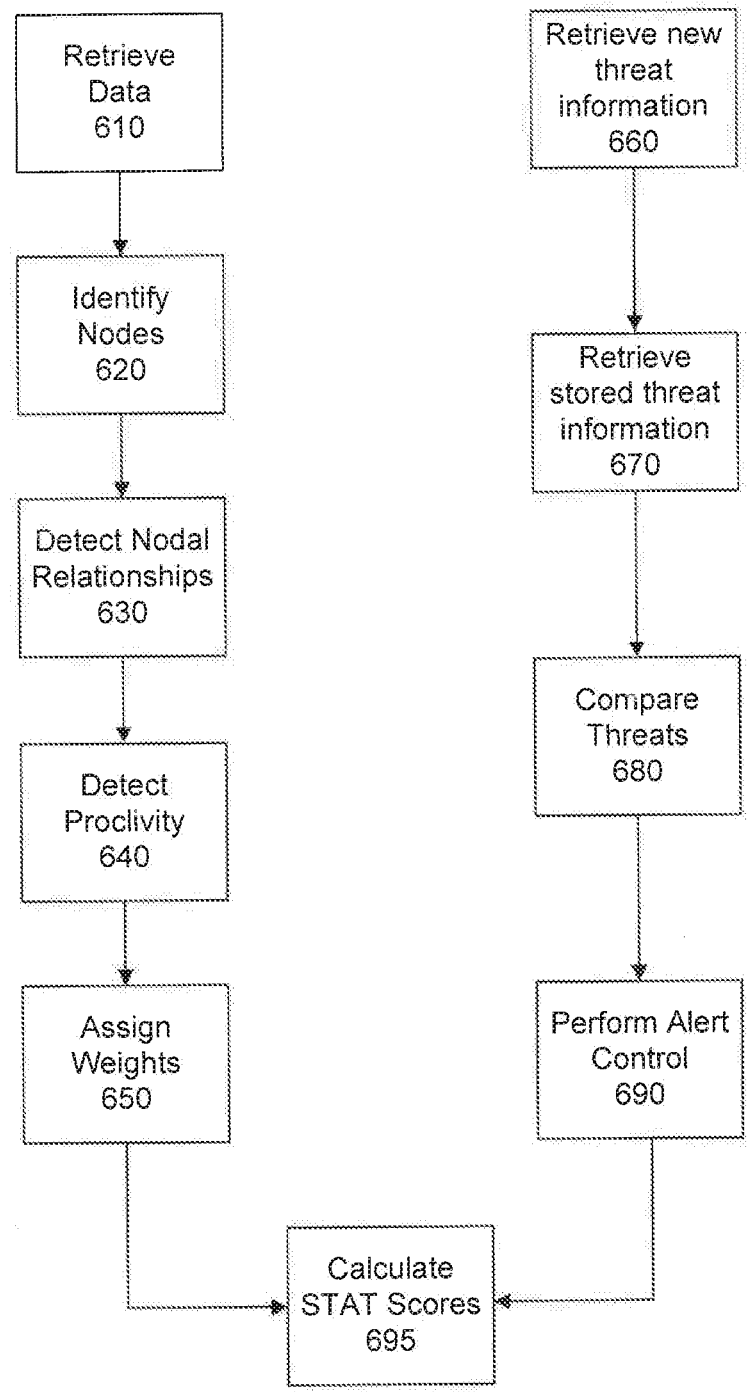
FIG. 6 illustrates a flowchart diagram of an exemplary method 600 for assigning STAT scores to an inmate according to an embodiment.

FIG. 6 illustrates a flowchart diagram of an exemplary method 600 for assigning STAT scores to an inmate according to an embodiment. The method 600 will be described with reference to the STAT subsystem 300.

The method 600 includes two primary paths: in an embodiment, a first path (left) is used for an initial STAT analysis of a large volume of data, whereas a second path (right) is carried out to update STAT scores based on one or a few subsequent communications. Along the left path, the volumes of data are retrieved or accessed (610). From analyzing the data, the system identifies certain nodes (620) that are of interest. Such nodes may be the use of particular keywords, the interaction with known bad actors, punishment for certain activities, etc. In the same process, the system identifies relationships between the different nodes (630). Based on these relationships, the system determines an inmate's proclivity for a particular threat (640). The system also assigns weights (650) to those proclivities based on the strength of the relationships. STAT scoring (695) is then performed on this information.

Along the right path, new threat information is received (660). This threat information may be from one or multiple subsequent communications that have occurred after the initial scoring. In order to analyze the new threat information, old treat information is retrieved from a database (670). The new and old threat information is compared to each other (680) in order to detect changes and/or trends. Depending on the results of the comparison, alerts may be generated (690) and administrative personnel may be notified. STAT scoring (695) is then performed on the comparison information and/or threat information. STAT scoring (695) evaluates the received information in order to assign a score to a particular inmate for a particular threat, as described in detail above.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 7:
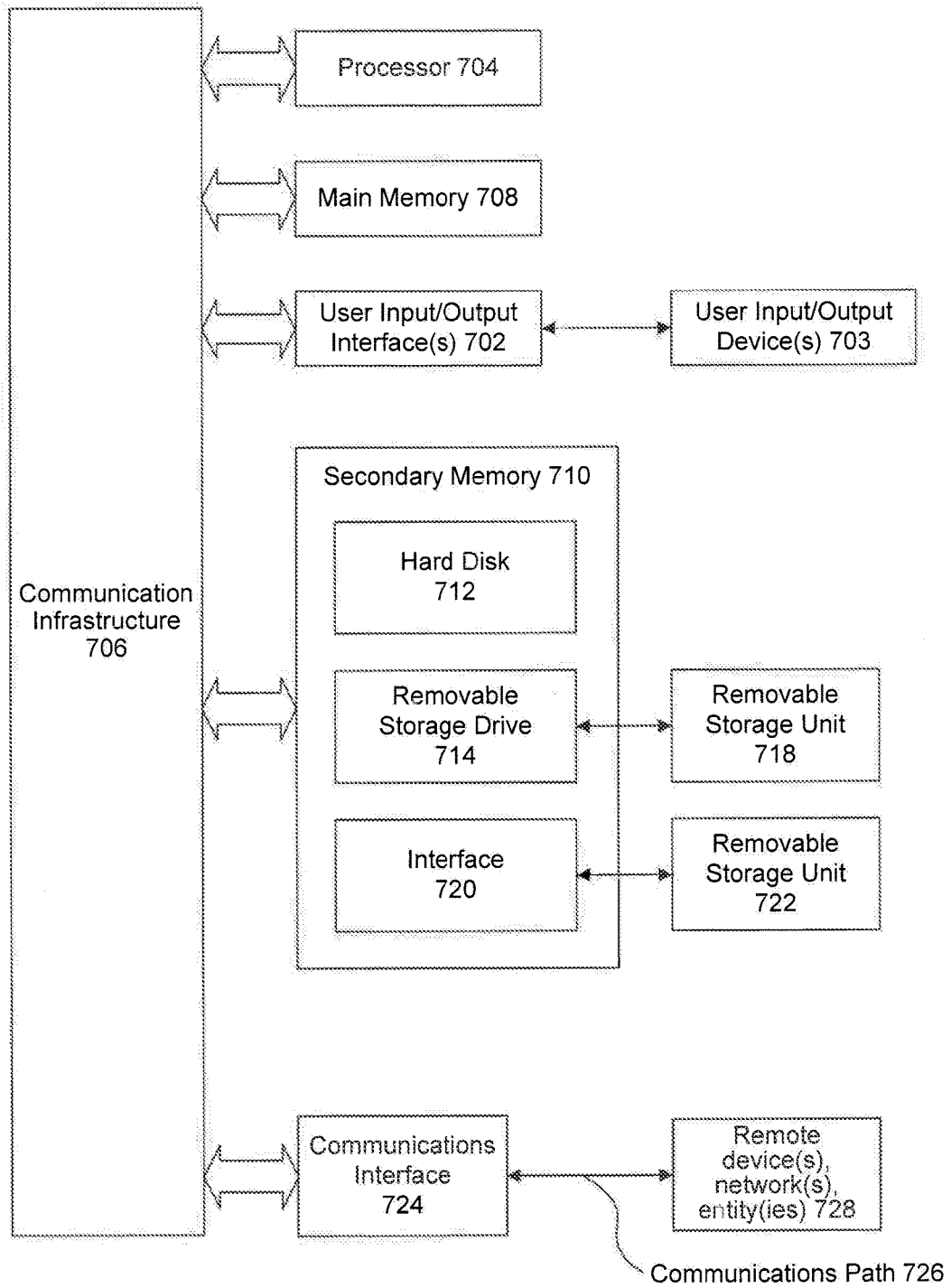
FIG. 7 illustrates a block diagram of an exemplary computer system according to an embodiment.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 5 and 6 can be implemented in the environment of one or more computer systems or other processing systems. An example of such a computer system 700 is shown in FIG. 7. One or more of the modules depicted in the previous figures can be at least partially implemented on one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for calculating a threat score for an inmate of a controlled environment facility, the system comprising:
    a monitoring subsystem configured to:
        receive an inmate communication;
        capture a voice sample of the inmate from the inmate communication;
        generate an inmate voiceprint based on the voice sample;
        compare the inmate voiceprint to previously-stored voiceprints in order to identify the inmate involved in the inmate communication;
        detect topics in the inmate communication; and
        assign weights to the detected topics; and
    a threat assessment subsystem configured to:
        receive the detected topics and the assigned weights from the monitoring subsystem;
        scale the weights assigned to the detected topics by a number of data points examined for the inmate;
        normalize the scaled weights based on scaled weights of other inmates;
        retrieve previously-stored threat information relating to the inmate;
        compare the received detected topics and scaled weights to the previously-stored threat information; and
        assign a threat score to the inmate based on the comparison.

2. The system of claim 1, wherein the monitoring subsystem is further configured to detect keywords in the inmate communication, and
    wherein the topics are detected based on the detected keywords.

3. The system of claim 2, further comprising a keyword database that stores a plurality of predefined keywords and a plurality of predefined topics, each of the plurality of predefined keywords being associated with at least one of the plurality of predefined topics.

4. The system of claim 3, wherein the monitoring subsystem is configured to detect the topics by identifying, for each of the detected keywords, the stored plurality of predefined topics to which the detected keywords correspond.

5. The system of claim 4, wherein the monitoring subsystem is configured to assign the weights to the detected topics based on a relative amount of detected keywords that correspond to the detected topics.

6. The system of claim 1, wherein the received inmate communication is a voice communication, and
    wherein the monitoring subsystem is further configured to transcribe the voice communication to text.

7. The system of claim 6, wherein the monitoring subsystem is configured to identify the inmate by:
  parsing a plurality of voices within the voice communication based on an audio analysis;
  generating a voiceprint for a parsed voice from among the plurality of voices; and
  comparing the generated voiceprint to previously-stored voiceprints associated with inmates of the controlled environment facility.

8. A system for calculating a threat score for an inmate of a controlled environment facility, the system comprising:
  a monitoring subsystem configured to:
    monitor inmate communication and activities;
    generate an inmate voiceprint from an inmate voice sample extracted from the inmate communication; and
    identify the inmate based on the inmate voiceprint; and
  a threat assessment subsystem configured to:
    access inmate information from one or more databases that store communication and activity data of the inmate;
    identify a plurality of data relationships within the communication and activity data;
    determine corresponding strengths of the data relationships;
    assign weights to the relationships based on the strengths;
    identify threats corresponding to the detected relationships;
    assign a positive score to all threats whose corresponding relationship weight exceeds a predetermined minimum value;
    identify all other threats as non-observed; and
    calculate the threat score based on the strengths.

9. The system of claim 8, wherein the one or more databases include call records, visitation records, and incident histories of the inmate.

10. The system of claim 8, wherein the identifying and determining are performed as part of a virtual link analysis of the communication and activity data.

11. The system of claim 8, wherein the threat assessment subsystem is configured to determine the strengths of the data relationships based on a number of logical connections between data elements.

12. The system of claim 8, wherein the threat assessment subsystem is configured to calculate the threat score for the inmate by:
  scaling the weights assigned to the relationships by a number of data points examined for the inmate; and
  normalizing the scaled weights based on scaled weights of other inmates.

13. The system of claim 8, wherein the calculating of the threat score further includes assigning a base value to all non-observed threats.

14. A method for calculating a threat score for an inmate of a controlled environment facility, the method comprising:
  receiving an inmate communication;
  generating an inmate voiceprint based on an inmate voice sample extracted from the inmate communication;
  identifying the inmate based on the inmate voiceprint;
  detecting topics in the inmate communication;
  assigning weights to the detected topics;
  scaling the weights assigned to the detected topics by a number of data points examined for the inmate;
  normalizing the scaled weights based on scaled weights of other inmates;
  comparing scaled weighted detected topics to previously-stored threat information; and
  assigning a threat score to the inmate based on the comparison.

15. The method of claim 14, further comprising detecting keywords in the inmate communication,
  wherein the topics are detected based on the detected keywords.

16. The method of claim 15, further comprising associating a plurality of predefined keywords with at least one of the plurality of predefined topics within a keyword database.

17. The method of claim 14, wherein the received inmate communication is a voice communication, the method further comprising:
  transcribing the voice communication to text.

18. The method of claim 17, further comprising:
  parsing a plurality of voices within the voice communication based on an audio analysis;
  generating a voiceprint for a parsed voice from among the plurality of voices; and
  comparing the generated voiceprint to previously-stored voiceprints associated with inmates of the controlled environment facility in order to identify the inmate.

19. The method of claim 14, wherein the topics are detected by identifying, for each of the detected keywords, the stored plurality of predefined topics to which the detected keywords correspond.

* * * * *